United States Patent [19]
Wade

[11] Patent Number: 5,299,676
[45] Date of Patent: Apr. 5, 1994

[54] ROTATION CHECK MECHANISM

[75] Inventor: Malcolm V. Wade, Meadowbank, Australia

[73] Assignee: IVG Australia Pty. Limited, Lidcombe, Australia

[21] Appl. No.: 929,897

[22] Filed: Aug. 11, 1992

[30] Foreign Application Priority Data

Aug. 15, 1991 [AU] Australia ............... PK-7791
Aug. 15, 1991 [AU] Australia ............... PK-7792
Jun. 3, 1992 [AU] Australia ............... PL-2761

[51] Int. Cl.⁵ .................. B60K 41/26; F16D 55/48
[52] U.S. Cl. ........................ 192/8 R; 192/7; 188/82.9; 188/134; 188/264 E
[58] Field of Search ............ 192/7, 8 R; 188/72.7, 188/134, 82.9, 264 B, 264 D, 264 E, 264 CC

[56] References Cited

U.S. PATENT DOCUMENTS

| | | | |
|---|---|---|---|
| 2,783,861 | 3/1957 | Jungles | 192/8 R |
| 3,347,345 | 10/1967 | Rogers et al. | 188/264 E |
| 4,483,429 | 11/1984 | Tiedeman | 192/8 R |
| 4,850,458 | 7/1989 | Allan et al. | 188/134 |
| 5,090,529 | 2/1992 | Fahy et al. | 192/8 R |

FOREIGN PATENT DOCUMENTS 1341707 12/1973 United Kingdom ........... 192/8 R

*Primary Examiner*—Richard M. Lorence
*Attorney, Agent, or Firm*—Smith-Hill and Bedell

[57] ABSTRACT

A cylindrical oil-filled casing (2, 3, 5) has an input shaft (12) on which are mounted a pair of braking rings (17, 26) which are allowed limited axial and circumferential movement with respect to one another. The ring (26) is driven by the shaft and drives the other ring (17) through a circle of angularly-spaced, spring-biassed balls (28) mounted in tear-drop shaped recesses in the opposed faces of the rings (17, 26). Each ring has a frusto-conical braking rim extending parallel to a frusto-conical braking surface (8, 9) provided on the casing part (5). The rims of the rings (17, 26) have angularly-spaced, shallow, chordal segments removed to provide recesses which, during rotation of the shaft (12), pump oil between the braking surfaces of the rings and the casing, to form hydraulic cushions therebetween. Reversal of the shaft torque causes the balls (28) to force the rings (17, 26) apart and into braking engagement with the casing to check rotation of the shaft. The pumping action of the recesses diminishes during braking so that the cushions collapse and do not impair braking.

18 Claims, 7 Drawing Sheets

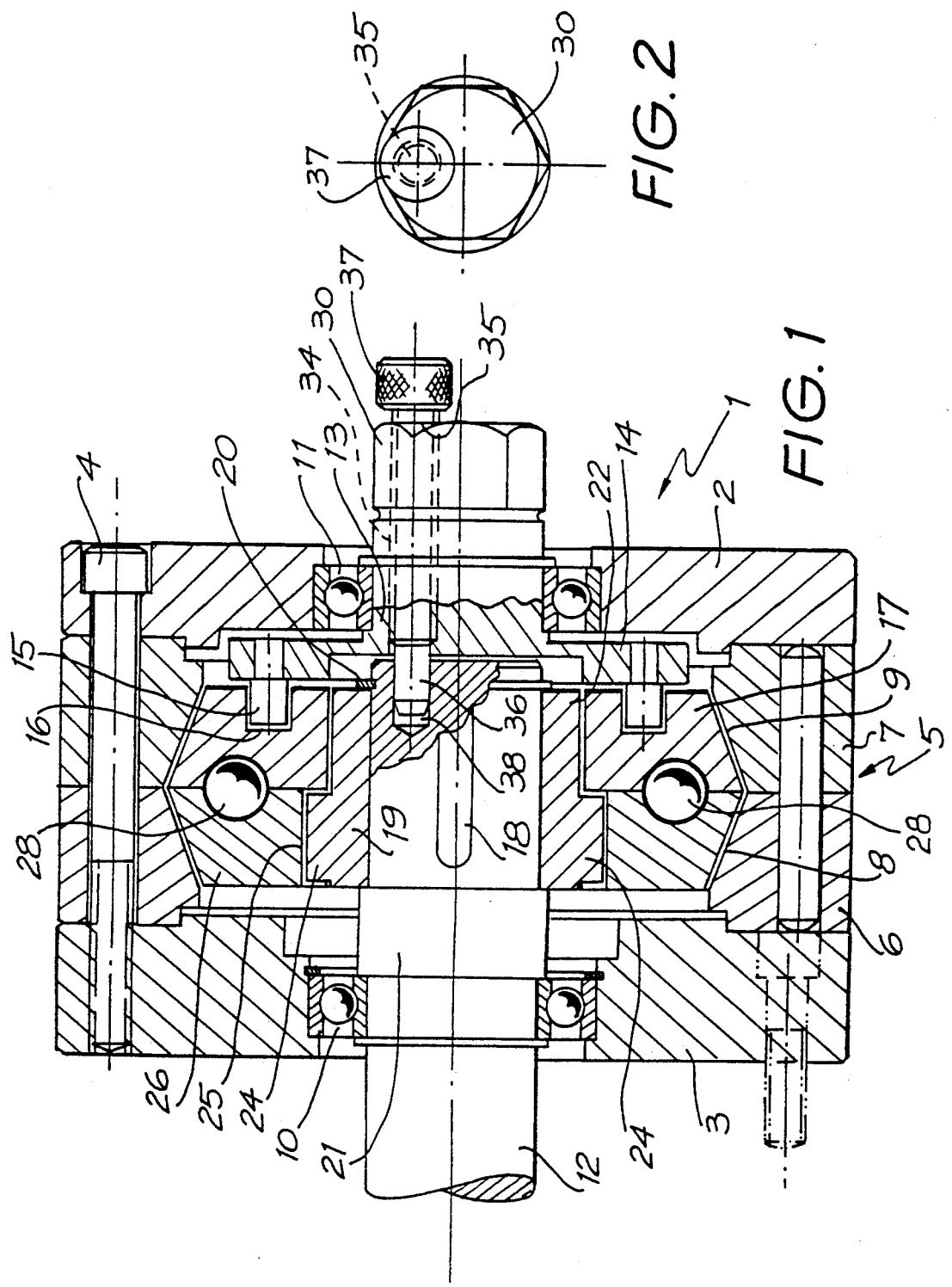

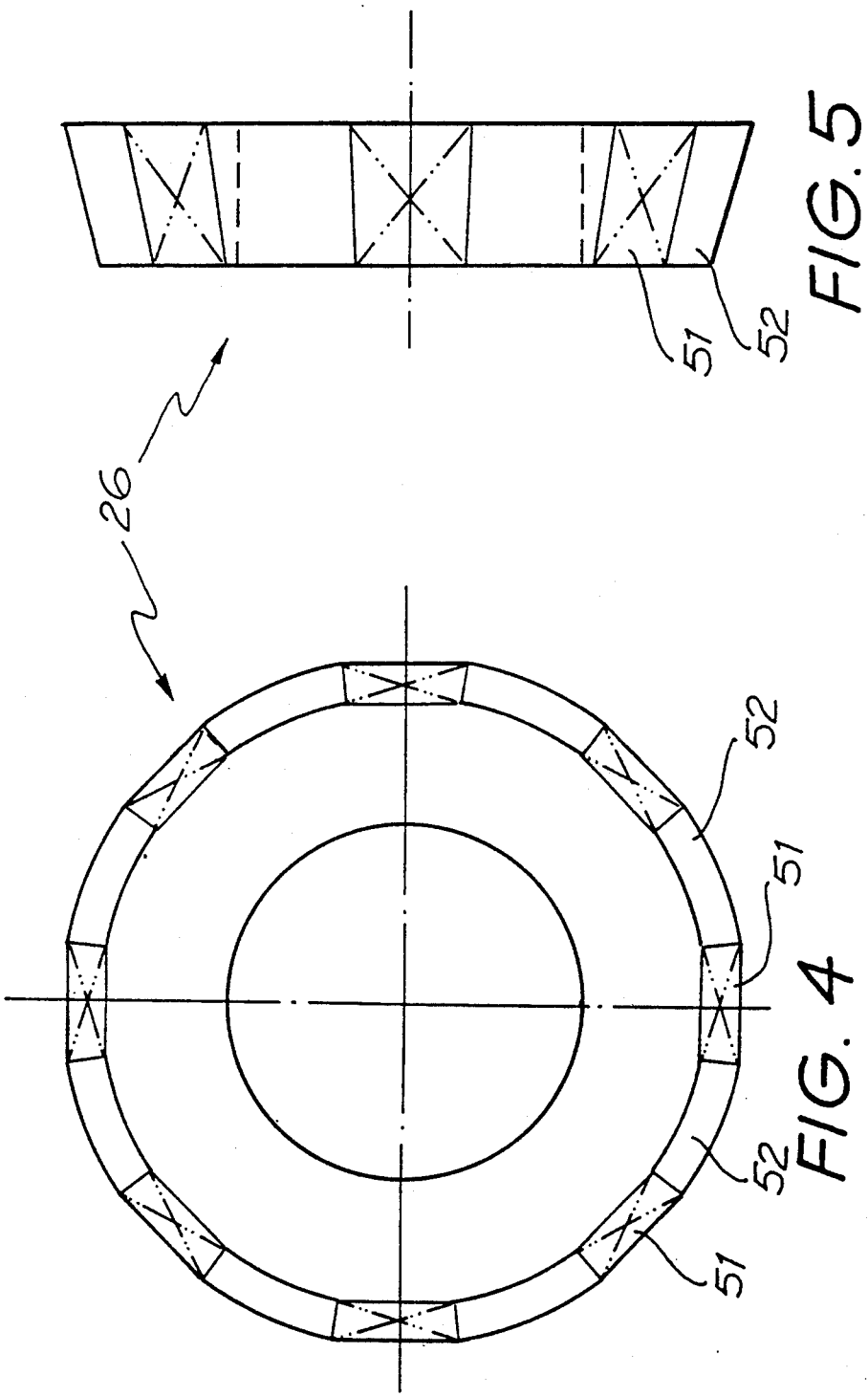

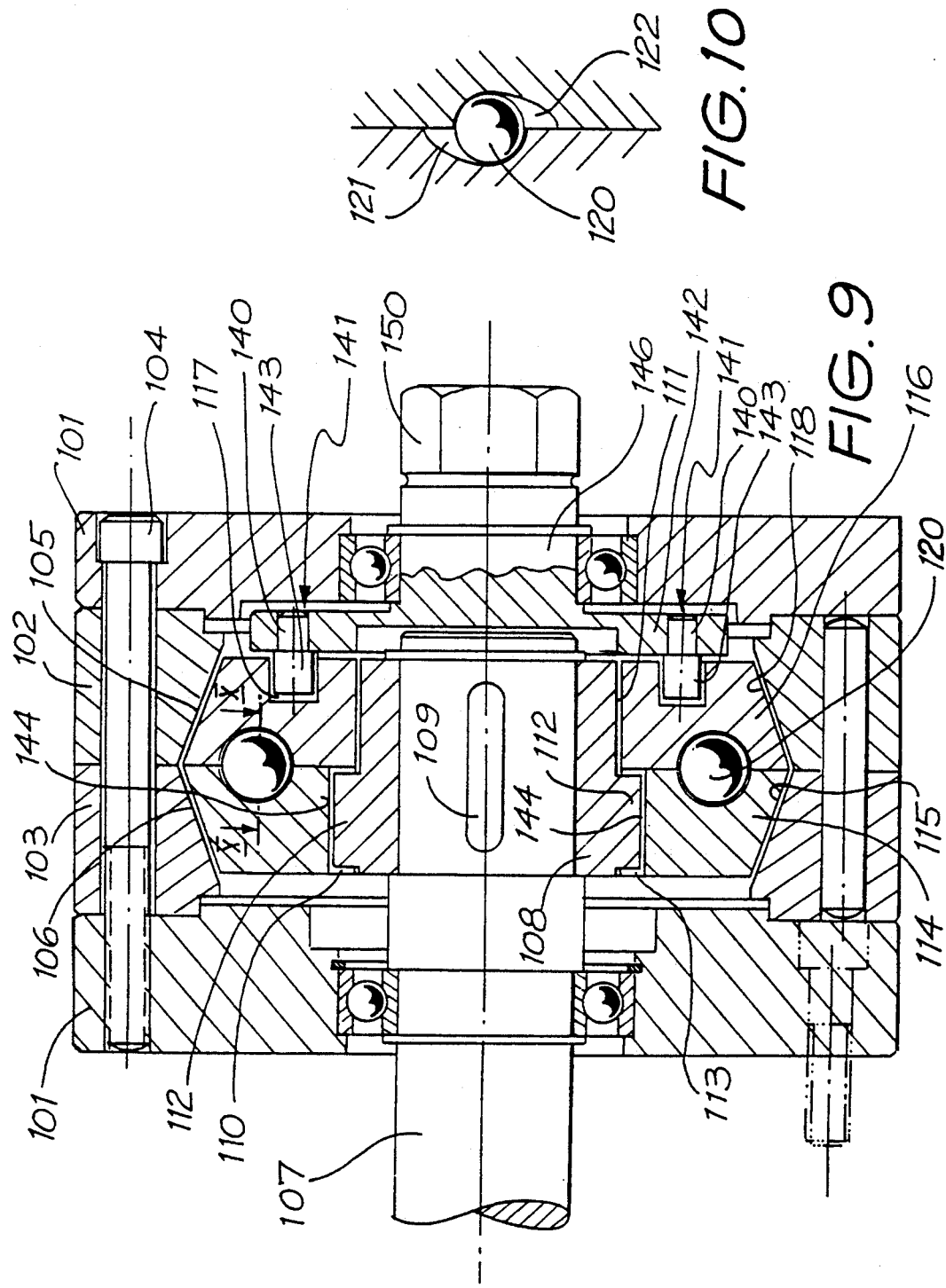

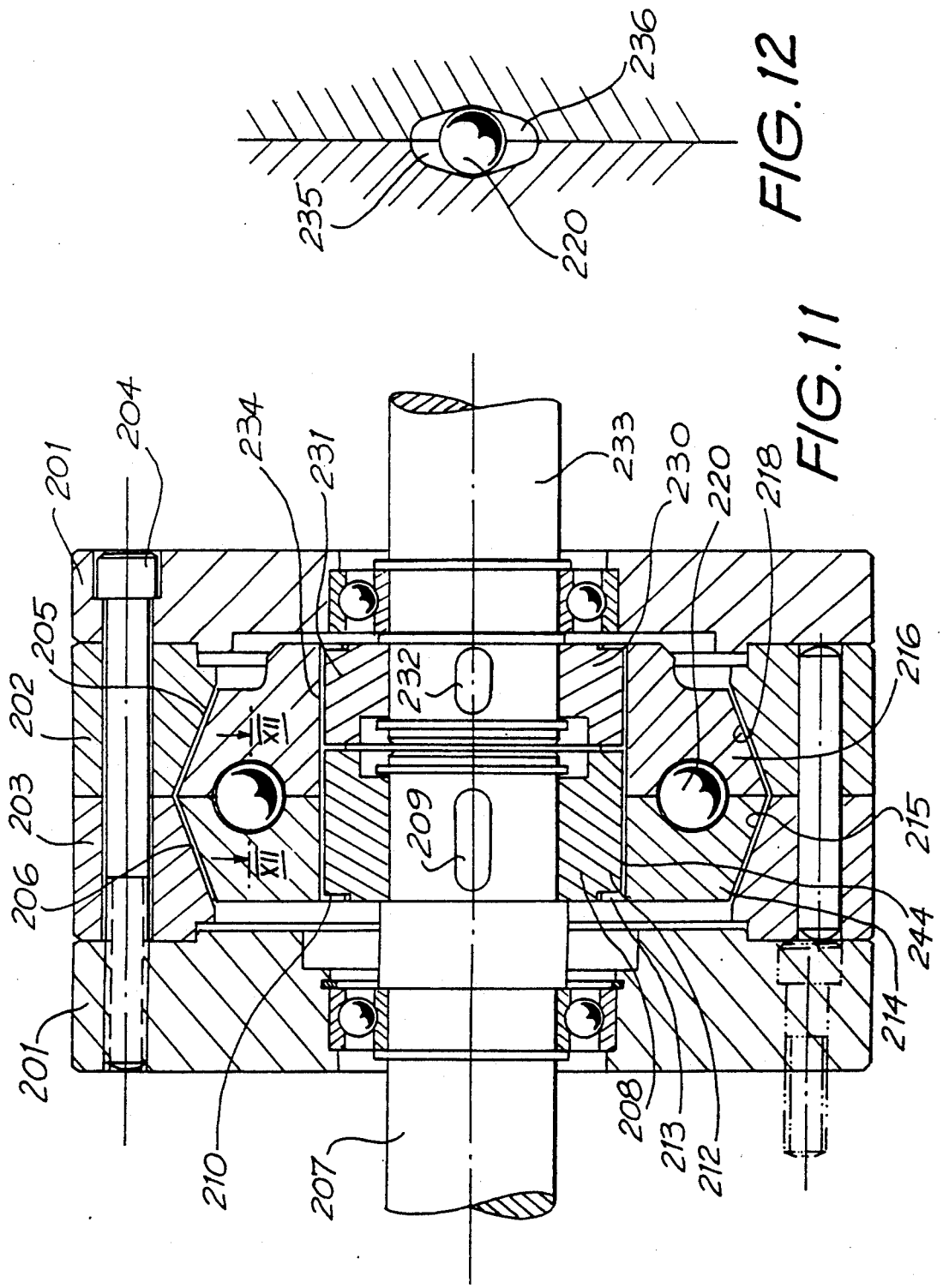

ROTATION CHECK MECHANISM

FIELD OF THE INVENTION

This invention relates to mechanisms for abruptly checking motion of a rotary drive, and is more specifically concerned with check coupling mechanisms and in-line braking mechanisms.

STATE OF THE ART

In our U.S. Pat. No. 5,090,529, hereby inserted by way of reference, is described a check coupling mechanism constructed as a backstop brake. The mechanism described in FIG. 4 of said Patent comprises an oil-filled casing having collinear input and output shafts projecting, respectively, from opposite sides. A gear pump driven by the output shaft is provided in the casing to feed oil under pressure into frusto-conical gaps located between complementary braking surfaces disposed in the chamber. Each of the shafts extends into the chamber and supports within it a rotary ring having a frusto-conical rim disposed adjacent one of the braking surfaces of the casing. Springs are located between the rings as are thrust-transmitting means provided by balls and tear-shaped recesses provided in opposed faces of the rings. The thrust-transmitting means serve to transfer torque from the ring mounted on the drive shaft, to the ring mounted on the driven shaft so that both rings rotate in the same direction. The rings are allowed to move axially and angularly with respect to one another. The recesses in the rings provide camming surfaces which, when the torque is applied in one direction between the rings, causes the balls to locate within the deepest portions of the recesses so that the frusto-conical rims of the rings are spaced from the braking surfaces in the casing. Oil pressure from the gear pump is applied to the frusto-conical gaps between the ring rims and the complementary braking surfaces, to hold them spaced from one another so that the drag of the mechanism on the drive shaft is limited only by the viscosity of the oil cushion provided in the frusto-conical annulii located between the braking surfaces of the rings and the casing. The springs located between the rings serve to urge them apart so that if the oil pressure in the cushions diminishes, the springs can thrust the two rings apart and into braking engagement with the casing.

If the direction of torque transmission from the input shaft to the output shaft of the mechanism is reversed, the balls run up the floors of the tear-shaped recesses which act as cams, and force the two rings apart and into braking engagement with the casing. The driven shaft then slows down rapidly and the oil pressure provided by the gear pump diminishes so that there is a collapse of oil pressure in the hydraulic cushions between the braking surfaces. Braking thus becomes accumulative and rapidly brings the drive shaft to a halt. The above-described arrangement is effective in operation but the provision of the gear pump and ducting in the casing naturally tends to increase the cost of the mechanism.

SUMMARY OF THE INVENTION

In accordance with the present invention a mechanism for abruptly checking the motion of a rotating input shaft, has an oil-filled casing containing two rings which are axially and angularly displaceable with respect to one another; braking surfaces provided on respective rings and which lie on respective frusto-conical surfaces; opposed braking surfaces provided on the casing and facing those of the rings, the braking surfaces of the casing also lying on frusto-conical surfaces which are complementary and parallel to those of the rings; resilient means acting to urge the two rings apart; and, a thrust-transmitting assembly composed of balls located in pockets and camming surfaces lying between the opposed faces of the rings, the thrust-transmitting means responding to a reversal in the direction of a driving torque applied to one of the rings by forcing the rings apart so that their rotation is abruptly checked by engagement of their braking surfaces with the braking surfaces of the casing; in which mechanism one of the braking surfaces has a series of circumferentially-spaced recesses dividing it into spaced arcuate braking zones, and each recess converges towards at least one of the braking zones flanking it. The effect of the recess converging towards a flanking zone is to exert a pumping action driving the recess oil into the annular gap between the opposed braking surfaces so that a cushion of oil under pressure is created between them to hold them apart.

PREFERRED FEATURES OF THE INVENTION

The recesses are preferably formed by removing equi-spaced chordal segments from the rim of the rings. Alternatively, scalloped depressions may be provided in the braking surfaces of the casing to achieve the same effect. The creation of the hydraulic oil cushions between the braking surfaces is described in our aforesaid United States Patent. However the present invention creates the cushions more simply and cheaply. Further advantages achieved are that regions of oil shear stress between the opposed braking surfaces, when the mechanism is in its non-operating or quiescent mode, is substantially limited to the arcuately spaced regions of the gap lying between the opposed braking surfaces of the casing and the rings. The aggregated area of these regions is less than is the case with the arrangement described in the aforesaid United States Patent, and thus the heating of the oil is diminished also. Although there is a corresponding reduction in the effective areas of the braking surfaces of the mechanism, the braking required can nevertheless be maintained by increasing the thrust which forces the braking surfaces towards one another when the mechanism assumes its operating mode, that is to say when it is exerting a checking function on the input drive, and also by the design and nature of the braking surfaces themselves. A further advantage is that each arcuately-spaced zones in which braking occurs, each which actually participates in the braking, forms one face of a gap which has a circumferential aperture through which the oil cushion can dissipate when the mechanism switches from its quiescent mode to its operating mode. The response of the mechanism is thus quicker than with the arrangement used in the aforesaid patent, the aperture through which the oil pressure can dissipate in said Patent is effectively limited to the two annular ends of the gap between the braking surfaces.

Preferably, the resilient means used to urge the two rings apart comprises a set of compression springs arranged in inclined bores in at least one of the rings and which respectively urge the balls in a direction which forces the rings apart. As long as the mechanism is in its quiescent mode, the drag of the driven ring on the drive ring is sufficient to overcome the thrusts of the springs so that the balls remain in the deepest portions of tear-shaped pockets providing the camming surfaces. However, if the direction of torque is reversed, the drag direction is also reversed and this allows the thrusts of the springs to force the balls up the camming surfaces so that the two rings are rapidly driven apart. A relatively rapid response to a reversal in torque is then obtained. Such an arrangement avoids the use of separate springs between the rings, and also the risk that some only of the balls will respond to a torque reversal by driving the rings apart. In prior art arrangements, when the balls are not individually biased by their own springs but rely only on the relative angular movement of the two rings, it was not unusual for the rings to be driven apart by a few only of the balls with the result that those balls were subjected to excessive loading for which they were not designed. The result of the excessive loading is a slowing down of the response time of the mechanism, a tendency for it to judder badly when assuming its operating mode, and, in one or two cases, for the mechanism to fail under the excessive forces generated.

INTRODUCTION TO THE DRAWINGS

The invention will now be described in more detail, by way of examples, with reference to the accompanying largely diagrammatic drawings, in which:

IN THE DRAWINGS

FIG. 1 shows, in vertical section, of a mechanism for checking rotation of a shaft, shown partly broken away, when switching from its quiescent mode to its operating mode;

FIG. 2 is a scrap end view of the central part of the mechanism shown in FIG. 1 as seen from the right hand end of that figure;

Figure 3:
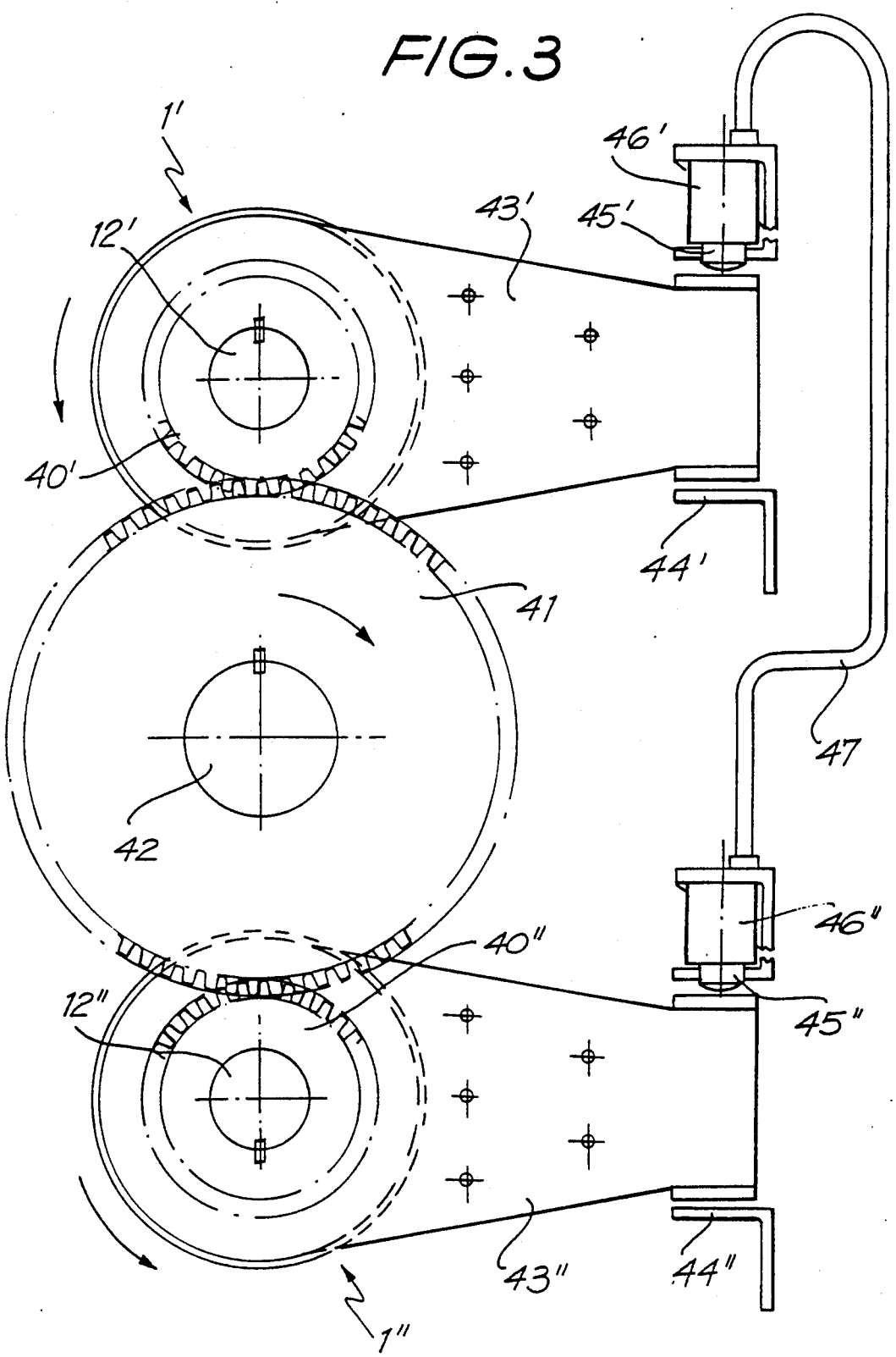
Figures 7, 8:
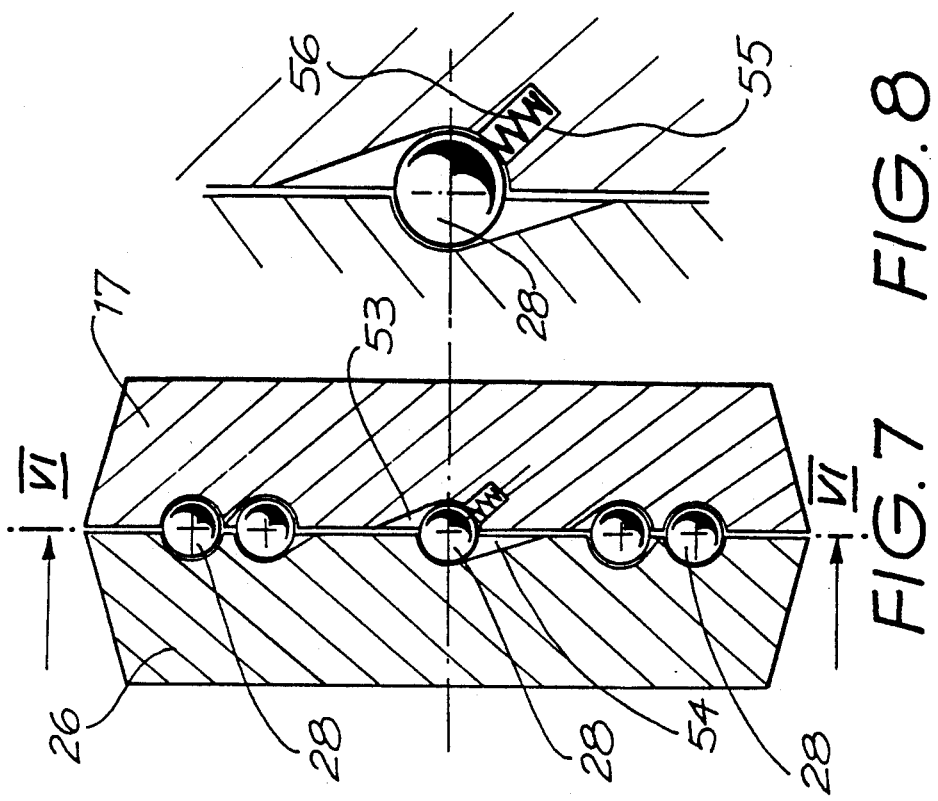
Figure 6:
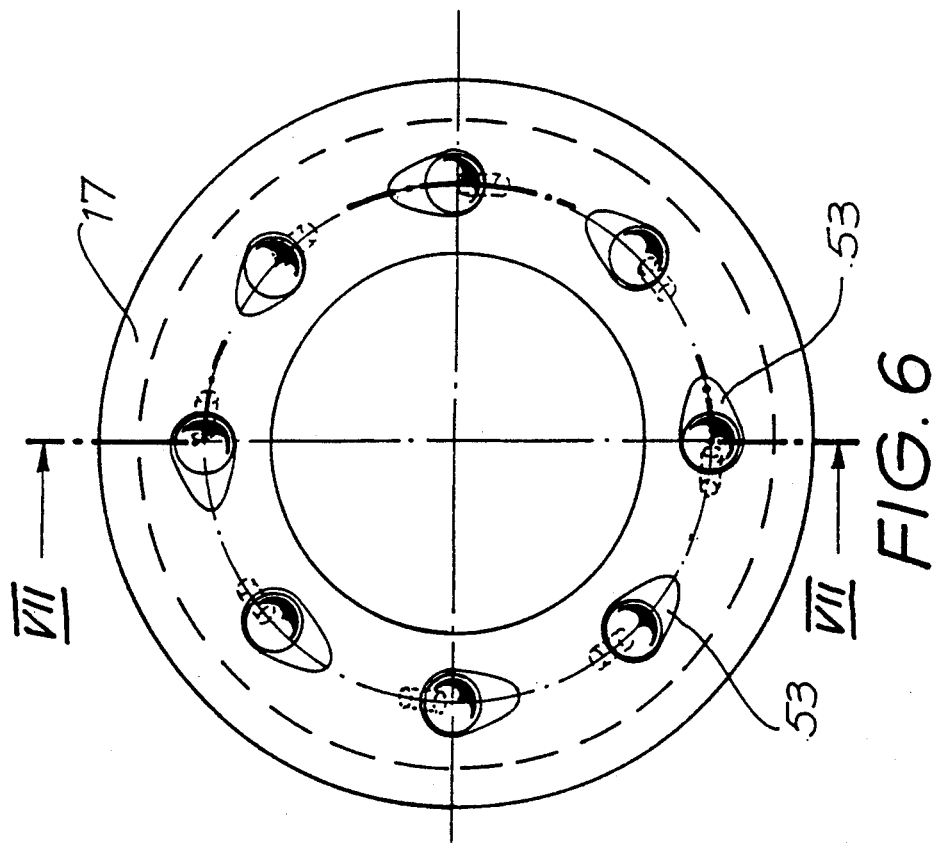
Figures 13, 14:
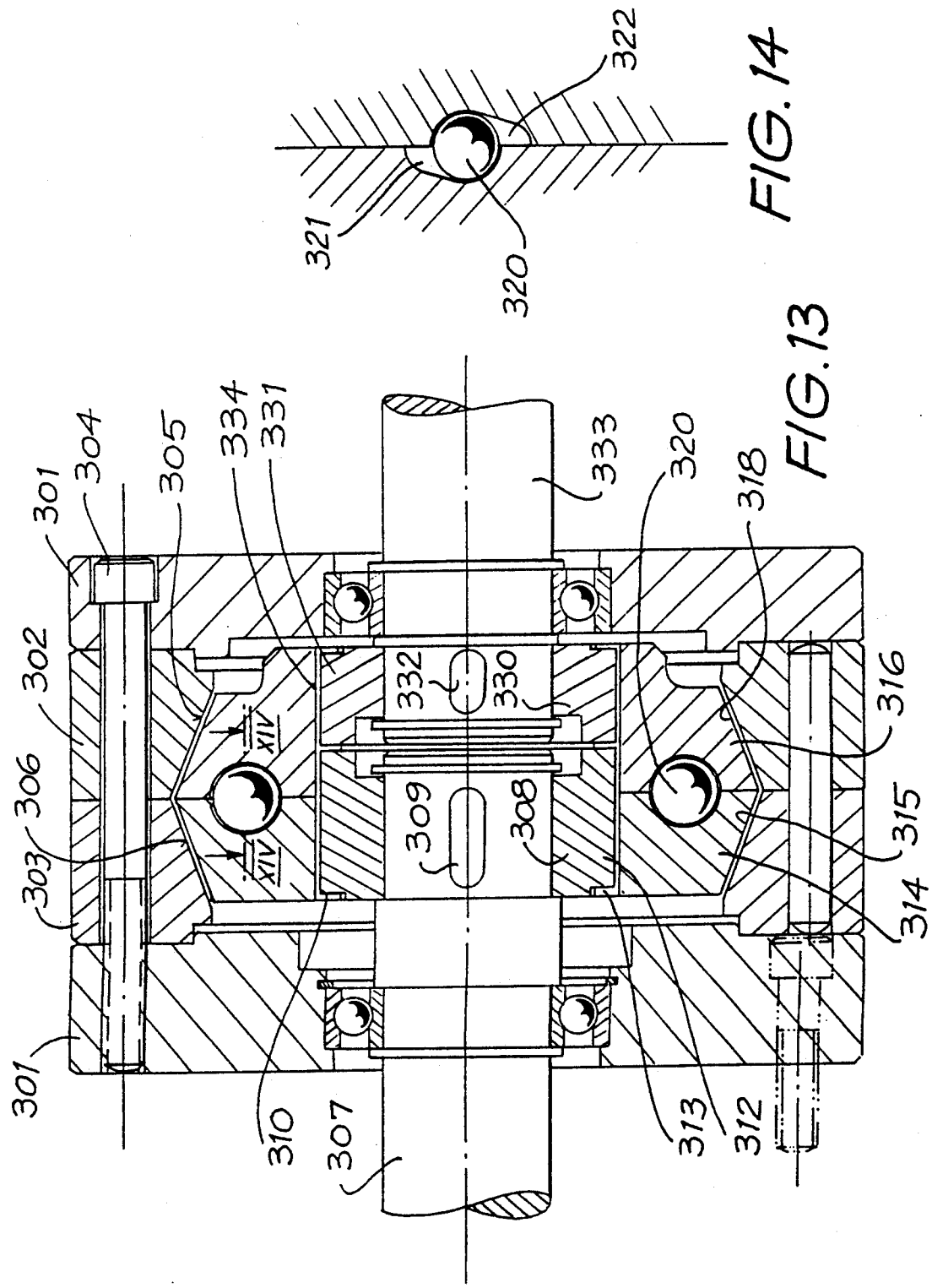

FIG. 3 diagrammatically represents an arrangement for balancing torque between two mechanisms of the form shown in FIG. 1, operating in parallel;

FIG. 4 is a diagrammatic end elevation of the peripheral margin of a rotary ring having an interrupted frusto-conical braking surface formed on its rim;

FIG. 5 is a side elevation of the ring of FIG. 4;

FIG. 6 is a view of the ring of FIG. 5 as seen from the right hand side of the figure and illustrates a ring of tear-shaped recesses or pockets provided in the ring and containing the respective spring-biased balls forming thrust-transmitting means;

FIG. 7 is a vertical section through two rings arranged as shown in FIG. 1, and taken along the line and in the direction indicated by the arrows VII—VII in FIG. 6;

FIG. 8 is an enlarged view of the central portion of FIG. 7 to show the arrangement of one ball and its biasing spring in more detail;

FIG. 9 is a vertical section showing principal parts of a mechanism constructed as a uni-directional drive coupling with a reverse uni-directional checks;

FIG. 10 is a scrap section taken on the line and in the direction indicated by the arrows X—X in FIG. 9;

FIG. 11 is a view corresponding to FIG. 9 but showing the principal parts of a coupling providing a bi-directional drive and a reverse bi-directional check;

FIG. 12 is a scrap section taken on the line and in the direction indicated by the arrows XII—XII in FIG. 11;

FIG. 13 is a view corresponding to FIG. 9 but showing the principal parts of a mechanism which provides a check coupling having a bi-directional drive and a reverse uni-directional check; and, FIG. 14 is a scrap section taken on the line and in the direction indicated by the arrows XIV—XIV in FIG. 13.

FIRST EMBODIMENT DESCRIPTION

The check mechanism shown in FIGS. 1 and 2 is of the general type described with reference to FIG. 3 of our aforesaid U.S. Pat. No. 5,090,529, inserted here by way of reference. It has a casing 1 provided with opposite end caps 2 and 3 which are attached by bolts 4 to respective ends of an intermediate cylindrical section 5 formed from two annular members which provide a pair of opposed frusto-conical braking surfaces 8, 9 inside the casing 1.

The end caps 2, 3 have respective central bearings 10, 11. The bearing 10 supports an input drive shaft 12 to which is applied the torque to be monitored by the check mechanism, and the bearing 11 supports a stub shaft 13 of a rotary spider frame assembly 14. The assembly 14 carries a ring of release pins 15 which locate in respective pockets 16 provided in a braking ring 17. This has a generally frusto-conical braking rim shown in FIGS. 4 and 5 and which is forced, by axial displacement of the ring 17, against the braking surface 9 when the check mechanism is operated.

The shaft 12 is connected by a key 18 to a surrounding stepped collar 19 inside the casing 1. The collar 19 is held against axial displacement by a circlip 20 on the shaft 12 at one end, and by a shouldered portion 21 of the shaft at the other end. The collar 19 has a cylindrical end portion 22 providing a bearing for the ring 17, and its other end portion is provided with two arcuate and circumferentially-spaced radial flanges 24. The flanges 24 respectively fit loosely into arcuate slots 25 provided on the inside face of a second braking ring 26. The engagement of the flanges 24 in their respective slots 25 allows ring 26 limited axial and circumferential movement on the shaft 12.

FIG. 4 and 5 show the generally frusto-conical rim portion of the ring 26 in more detail. The other ring 17 is similarly constructed. The ring 26 has its frusto-conical rim of interrupted form, in that it is divided into accurately-spaced braking zones 52 by the formation of a circumferentially-spaced chordal flats 51. These flats provide pumping recesses and reduce the surface area of the ring rim dedicated to braking, to between 40% and 44% of the area available for braking when the opposed braking surfaces are truly frusto-conical as is the case with our aforesaid United States Patent. However this disadvantage is capable of being entirely offset by an appropriate choice of braking surfaces materials and by the aggregated thrusts of springs which force the two rings apart to initiate braking when the mechanism switches from its quiescent mode to its operating mode.

Located between the two rings 17 and 26, at angularly spaced positions, are thrust transmitting means shown in more detail in FIGS. 6, 7 and 8. Such means are provided by a set of arcuately spaced steel balls 28 held partly in each of the two tear-shaped recesses or pockets provided in the opposed faces of the rings 17 and 26. The tails of the tear-drops extend in one direction of rotation on one of the rings, and in the other direction of rotation on the other ring. The floor of each recess slopes upwards towards its 'tail' to provide a camming surface and each of the balls is provided with its own bias spring 56 located in an inclined bore 55 and which urges the ball up the camming surface of the associated recess. The two rings 17 and 26 are thus urged apart by the aggregated spring bias provided on the balls 28. The torque of the shaft 12 applied to the ring 26 by way of the flange 24 and the end-wall of the slot 25, angularly displaces the ring 26 with respect to the ring 17 in a direction which forces the balls 28 against the resilience of their springs to the positions shown in FIG. 7. In these positions illustrated, the balls are located in the deepest regions of the recesses or pockets. This corresponds to the quiescent mode of operation of the mechanism. The bore 55 is inclined at an angle to the direction of rotation of the ring 17 in which is formed as illustrated.

The stub shaft 13 protrudes out of the end cap 2 to provide a release facility. It is formed at its end with a hexagonal nut 30 to which a wrench (not shown) can be applied progressively to allow the shaft 12 to be turned, under complete manual control, in the direction of the reversed torque, after the check mechanism has assumed its operating mode. This is described in more detail in our aforesaid United States Patent. A further bore 34 which is eccentric to the axis of the stub shaft 13, extends inwardly through the stub shaft and contains a latching screw 35 having an axial pin 36 at one end inside the casing, and a knurled opposite end 37 to enable the axial position of the screw 35 to be altered from outside of the casing 1. The end face of the shaft 12 inside the casing 1 is provided, off-centre, with a well 38 at a position at which it can be engaged by the pin 36 when the screw 35 is screwed into the bore 34. During normal operation of the mechanism when it is in its quiescent mode, the screw 35 is unscrewed sufficiently to disengage the pin 36 from the well 38.

OPERATION OF THE FIRST EMBODIMENT

During quiescent operation of the mechanism shown in FIG. 1, the two rings 17 and 26 assume the positions shown in FIG. 7 at which the balls 28 are contained in the deepest portions of the tear-shaped recesses 53 and 54 on respective rings 17 and 26. There is then minimum drag applied to the shaft 12. The springs 56 are held in compression by the drag of the ring 17 on the ring 26. This drag is produced by the viscosity of the oil between the braking zones 52 of the ring 17 and the frusto-conical braking surface s 8 and 9 formed inside the casing 1.

The rotation of the rings 17 and 26 and the shapes of the recesses 51, causes the oil in the recesses 51 to be wedged by their pumping action into the gaps formed between the braking zones 52 of the rings and the opposed frusto-conical surfaces of the casing. Such pumping action creates cushions of oil under pressure between the braking surfaces of the rings and casing so that they are held apart and do not rub against one another. The oil in these gaps is subjected to shear stress but it is prevented from overheating by flowing out of the gaps via the annulus formed around the edges of the zones 52, so that there is a relatively rapid circulation of oil through the pressure cushions. The degradation of the oil through the effects of the shear stress and heating, is therefore relatively small.

If the drive torque on the shaft 12 is removed, the combined thrust of the springs 56 acting on the balls 28 forces the two rings 17 and 26 apart against the pressure of the oil cushions. The resistance to this thrust rapidly diminishes as the oil flows quickly out of the cushions when the pumping effect of the chordal recesses diminishes as a result of the speed of rotation of the rings 26, 17 diminishing. Also, as the balls are acted on by their individual springs, there is no risk of some only of the balls being effective to force the rings apart. Thus a prompt reliable and abrupt braking action ensues with the thrust-transmitting means provided by the balls 28 and the camming surfaces of the associated recesses all being effective.

When the mechanism is in its operating mode and the shaft 12 has been checked to a halt, the stub shaft 13 protruding out of the end cap 2 can be used to provide a release facility as fully described in our aforesaid United States Patent. However there are situations when it is required temporarily to neutralise the checking action of the mechanism when a reverse torque is applied, for example, to enable maintenance routines to be carried out. This is effected as follows.

With the shaft 12 manually held against rotation, the nut 30 is rotated sufficiently in a direction which moves the balls 28 into the deepest portions of their recesses so that the two rings 26 and 17 are at their closest relative positions. This simultaneously brings the pin 36 opposite the well 38. The knurled head 37 may then be turned manually to engage the pin 36 with the well 38. This locks the angular position of the shaft 12 and thus the ring 26, with that of the spider assembly 14 and thus the ring 17. The balls 28 are then prevented from moving out of their deepest positions in their recesses and the braking capability of the mechanism is temporarily neutralised so that the shaft 12 can be turned freely in either direction to enable the required maintenance to be carried out. On completion of the maintenance, the nut 37 is unscrewed to free the pin 36 from the well 38. The check mechanism can then function normally.

SECOND EMBODIMENT DESCRIPTION

Referring to FIG. 9, support plates 101 carry two coaxially mounted annular members 102, 103 attached by bolts 104 to provide a casing for the coupling. The members 102, 103 each provide an internal frusto-conical braking surface. The braking surface of the member 102 is referenced 105 and that of the member 103 is referenced 106. The two braking surfaces are adjacent and opposed to one another, as illustrated.

Shaft 107 passes concentrically through the two members 102, 103 and carries a collar 108 between them. The collar 108 has an internal key-way 109 which receives a key attaching the collar stiffly to the shaft.

The collar 108 has its external surface providing two axially-spaced circumferential zones 110 and 111. The zone 110 is equipped with four equiangularly spaced dogs 112 each of rectangular cross-section, and the zone 111 has a smooth cylindrical external surface.

A ring 114 having a generally frusto-conical rim 115 formed with chordal flats as has already been described with reference to FIGS. 4 and 5, is internally provided with slots 144 each of which accommodates one of the dogs 112 so that the ring 114 is slideable and loosely mounted on the dogs 112. This permits its rim 115 to have limited angular, radial and axial displacement with respect to the member 103. Rim 115 is arranged opposite and substantially parallel to the braking surface 106, and is axially spaced from it when the coupling is in is quiescent mode.

A second ring 116 is mounted on the cylindrical zone 111 of the collar 108 and is loosely coupled to a coaxially arranged output shaft 146 by a ring of studs 140 having their shanks attached at angularly spaced positions 141 to a radial flange 142 on the shaft, and their heads 143 located in holes 117 in the member 116.

Mounted between the opposed and spaced faces of the rings 114 and 116 are a set of incompressible thrust-transmitting means. Each such means comprises a spring-biassed steel ball 120, identical to the ball 28 of FIG. 1, having diametrically opposite parts of its surface seated in two opposed tear-shaped recesses 121, 122 provided in the rings 114 and 116 as has already been described with reference to FIGS. 6, 7 and 8. The recesses each provide a camming or ramp surface extending circumferentially with respect to the axis of rotation of the rings and the camming surfaces of each pair of opposed recesses respectively extend in opposite directions as shown in FIG. 10. Thus relative angular movement between the rings in one direction of rotation, causes each ball to seat in the deepest parts of its flanking recesses, whereas relative angular movement of the rings in the opposite direction causes the balls to travel up the camming surfaces towards the shallowest parts of the recesses with the result that the rings 114, 116 are thrust apart by the thrusts of the individual springs on the balls 120.

OPERATION OF SECOND EMBODIMENT

In operation of the coupling described, rotational drive of the shaft 107 causes rotation of the collar 108. The dogs 112 are carried into engagement with one of the radially extending sides of the slots 144 in the ring 114 causing it to rotate. This rotates the ring in a direction which moves the balls 120 into the deepest parts of their recesses and they consequently impart the rotational drive to the other ring 116 as the coupling, at this time, is in its disengaged or quiescent mode. The ring 116 is free to rotate on the zone 111 of the collar 108 and thus transmits drive to the output shaft 146.

If the input drive to the coupling ceases, it assumes its operative or engaged mode at which it checks the load. This results from the ring 114 moving angularly with respect to the ring 116 in a direction which causes the balls 120 to ride up their camming surfaces and force the two rings apart. This is permitted by the slots 144 riding lengthwise along the dogs 112. The interrupted frusto-conical rims of the rings move apart and into engagement with the braking surfaces of the casing. The full torque of the load is applied to the thrust-transmitting means so that braking of the rotation of the input and output shafts of the coupling occurs abruptly. As both rings 114, 116 are allowed limited radial movement on the collar, the effect of their rims engaging the braking surfaces 106, 105 is to produce a self-centering effect so that the areas between which braking occurs is maximised.

To release the coupling once it has engaged, it is necessary to turn one of the two shafts in a direction which causes the balls 120 to ride down their camming surfaces into the deepest parts of their associated recesses 121, 122 once again. This occurs automatically when the drive is re-applied to the ring 114 or when the ring 116 is manually rotated in the appropriate direction by the application of a spanner (not shown) to a hexagonal nut 150 provided around the outer end of the shaft 146.

As with all of the other embodiments described in this specification, the casing is oil-filled, and the balls 120 are spring biassed, as described in figures 6,7 and 8 above.

THIRD EMBODIMENT DESCRIPTION

The check coupling provided by the arrangement of FIG. 11 provides a bi-directional drive with a bi-directional check being applied if the drive is disconnected in either direction. Parts of FIG. 11 corresponding to those already described with reference to FIG. 9 are similarly referenced but are in the '200' series and will not therefore be again described to save unnecessary repetition of description.

The collar 208 of FIG. 10 has the dogs 212 extending axially throughout its length. A second collar 230 of the same internal and external dimensions as collar 208 is arranged in-line with the collar 208 and is likewise equipped with four external dogs 231 of the same cross-sectional shape as the dogs 212, and aligned therewith. The collar 230 has an internal key way 232 for receiving a key which attaches it stiffly to an output drive shaft 233.

The rings 214, 216 have their opposed faces provided with double-ended tear-shaped recesses 235, 236 as shown in FIG. 12. When the two rings 214, 216 are at their closest positions to one another, as illustrated in FIG. 11, the balls 220 occupy central positions in their double-ended recesses 235, 236. Each of the balls is provided with associated bores containing compression springs (not shown) arranged as shown in FIGS. 7 and 8, so that when the coupling is to switch from its quiescent mode to its operating mode, the springs exert a force on the balls causing the two rings 214, 216 to be forced apart thus bringing their frusto-conical rims 215, 218 into engagement with the frusto-conical braking surfaces 206, 205 of the casing. The rings 214,216 once again have frusto-conical rims formed with pumping recesses (see FIGS. 4 and 5.)

It will be noticed that in the arrangement of FIG. 11, the ring 216 is axially longer than the second collar 230 and is provided internally with axial slots 234 of the same cross-sectional shape as the slots 244 inside the ring 214 and which are aligned therewith.

The coupling is assembled with the input drive shaft 207 attached to the collar 208 and the output drive shaft 233 attached to the collar 230. The dogs 212 of the collar 208 are contained partly in the slots 244 of the ring 214 and partly in the slots 234 of the ring 216. The dogs 231 of the second collar 230 are contained wholly within the slots 234 of the ring 216 as shown.

OPERATION OF THIRD EMBODIMENT

The coupling of FIG. 11 operates as follows: During starting up, when the coupling is in its quiescent mode, the rotation of the drive shaft 207 is transferred to the collar 208 via the key way 209. The dogs 212 of the collar 208 transmit the drive to both rotary rings 214, 216 in unison, by way of the slots 244 and the balls 220. In all cases the slots 244 and 234 are substantially wider circumferentially, and slightly wider radially than the dogs they contain. The rotation of the ring 216 is transferred by the radially-extending end walls of the slots 234 to the dogs 231 of the second collar 230 which is stiffly keyed to the output shaft 233 so that it rotates with the input shaft 207. If the output shaft 233 should accelerate beyond the speed of the input shaft 207, or if the drive to the input shaft 207 should fail, the dogs 231 will advance in phase with respect to the dogs 212 and cause angular movement of the ring 216 to occur with respect to the ring 214 under the influence of the spring-biassed balls 220.

The balls 220 then run up the camming or ramp surfaces at one or other end of the recesses 235, 236 and force the rings 214, 216 apart so that their rims brake on the surfaces 206, 205 and both input and output shafts are brought to an abrupt halt. To enable rotation to re-commence, the relative angular movement between the rings 214, 216 must be reversed to allow the balls to re-assume their mid-position in the deepest parts of the recesses 235, 236 as shown in FIG. 2.

Because the recesses are double-ended, the same abrupt braking will occur irrespective of the direction of rotation of the input shaft 207 driving the collar 208. The only difference will be that braking will occur as a result of the balls 220 running up the camming or ramp surfaces at the other pair of ends of the opposed recesses 235, 236.

DESCRIPTION OF FOURTH EMBODIMENT

The arrangement shown in FIG. 13 provides a bi-directional drive with a reverse unidirectional check facility. Parts of FIG. 13 corresponding to equivalent parts of FIG. 9 are similarly referenced but in the '300' series. To avoid needless repetition, these parts will not be again described in detail.

The arrangement of coupling of FIG. 13 is virtually the same as that shown in FIG. 11 except that the teardrop shaped recesses 321, 322 are single-ended as shown in FIG. 14, and not double ended as shown in FIG. 12. As a consequence, the abrupt halting of rotation of the coupling will only occur when the relative angular movement between the rings 314, 316 is in one direction. This occurs when the spring-biassed balls 320 run up the ramp or camming surfaces at one end of the recesses 321, 322 and force the rings 314, 316 apart. Angular movement of the rings 314, 316 in the reverse direction is prevented by the balls 320 engaging the end walls of their associated recesses 321, 322 and simply transmitting the rotational drive between the two rings 314, 316 which each has an interrupted frusto-conical rim (see FIGS. 4 and 5).

FIFTH EMBODIMENT DESCRIPTION

FIG. 3 shows how two torque checking mechanisms can be safely operated in parallel.

It is common practice to provide a piece of equipment being monitored, with two torque-checking mechanisms so that the torque to be checked, which can be very large, is shared between them. However, in practice, two torque-checking mechanisms seldom operate in precisely the same way. One of the mechanisms is invariably subjected to the full torque to be checked, before the other one commences operation. The arrangement shown in FIG. 3 is designed to overcome this difficulty.

FIG. 3 shows a drive shaft 42 whose rotation is to be checked abruptly in the event of the torque being reversed. The drive shaft 42 carries a pinion 41 which is in mesh with a pair of gear wheels 40' and 40". These are arranged at diametrically opposite positions on the pinion 41.

Each of the gear wheels 40', 40" is connected to the input shaft of a check coupling of the form shown in FIG. 1. Each check coupling has a casing 1', 1" which, instead of being anchored to a bed plate is fixed to one end of an arm 43', 43". The arm allows the casing limited rotational movement through a degree or two. The end of the arm lies between an abutment 44', 44" and a piston 45', 45". Each of the pistons 45', 45" has an associated cylinder 46', 46" interconnected by way of hydraulic piping 47.

OPERATION OF FIFTH EMBODIMENT

During normal operation of the equipment when checking of the torque is not required, the pinion 41 rotates in the direction of the arrow illustrated. This motion is imparted to the two check couplings which are in their quiescent modes. Their input shafts 12', 12" rotate in the direction of the arrows illustrated, so that the two arms 43', 43" press against their corresponding pistons 45', 45".

In the event that the direction of torque of the pinion 41 reverses, a corresponding rotational torque is applied to the two gear wheels 40', 40". In the unlikely event that they operate truly simultaneously, their arms 43', 43" will simultaneously impact on the abutments 44', 44" so that the torque to be checked be divided equally between them.

If, as is invariably the case, one of the check mechanisms, say that associated with the arm 43' operates first, its arm 43' will impact on the abutment 44'. This frees the piston 45' so that hydraulic oil passes from the cylinder 46" to the cylinder 46' by way of the piping 47. The upward movement of the piston 45" thus permitted, causes the arm 43" of the casing 1" to turn in a direction which momentarily removes torque from the associated check mechanism, causing it immediately to switch from its quiescent mode to its operating mode. Both check mechanisms thus operate together to assume their operating mode despite their characteristics being different, so that the reverse torque of the pinion 41 is divided equally between the two check mechanisms.

I claim:

1. A mechanism for abruptly checking the motion of a rotating input shaft comprising: an oil-filled casing; two rings which are axially and angularly displaceable with respect to one another mounted coaxially within said casing; braking surfaces provided on respective rims of said rings and lying on respective frusto-conical surfaces; opposed braking surfaces provided on the casing and facing those of the rings, the braking surfaces of the casing also lying on frusto-conical surfaces which are complementary and parallel to those of the rings; resilient means acting to urge the two rings apart; a thrust-transmitting assembly positioned between the rings and composed of balls located in a circle of spaced pockets providing respective camming surfaces; and a series of circumferentially-spaced recesses provided on at least one of said braking surfaces and dividing it into circumferentially spaced arcuate braking zones, each of said recesses converges towards at least one of said braking zones flanking it.

2. A mechanism as claimed in claim 1, in which the recesses are respectively formed on the rim of each ring by a series of equi-spaced chordal segments removed from the rim.

3. A mechanism as claimed in claim 1, in which each of the balls is biased by a respective compression spring in a direction which urges the rings apart, said springs forming said resilient means and being located in respective bores formed in the ring, each of said springs exerting a thrust on its ball acting urging it towards the shallow end of a tear-shaped pocket locating said ball.

4. A mechanism as claimed in claim 3, in which each of said pockets is double-ended and has its deepest part in the centre of the pocket, each ball being acted upon by two springs each located in its own bore.

5. A mechanism as claimed in claim 1, in which at least one of said rings is loosely mounted on dogs attached to a collar fixed to the shaft, said rings being angularly and axially displaceable with respect to one another and each of the rings being also permitted limited tilting movement about its centre.

6. A mechanism for abruptly checking the motion of a rotating input shaft comprising: an oil-filled casing; coaxial input and output shafts respectively extending into opposite sides of said casing; first and second collars respectively attached to said shafts; dogs formed on said collars and extending radially and arcuately therearound; two rings loosely mounted on said dogs which are received in slots in said rings said slots permitting limited axial and angular displacement of said rings on said dogs, one of said rings being mounted wholly on said dog rotated by said input shaft and the other of said rings being partly mounted on each of said dogs; braking surfaces provided on respective rims of said rings and lying on respective frusto-conical surfaces; opposed braking surfaces provided on said casing and facing those of the rings, said braking surfaces on the casing lying also on frusto-conical surfaces which are complementary and parallel to those of the rings; resilient means acting to urge the two rings apart; a thrust-transmitting assembly positioned between the rings and composed of balls located in a circle of spaced pockets providing respective camming surfaces for said balls; and a series of circumferentially-spaced recesses provided on the rims of the rings an and dividing said rims into spaced arcuate braking zones, each of said recesses converging towards at least one of said braking zones flanking it to pump oil from said recess into the space between the braking zones of the rings and the frusto-conical braking surfaces of the casing when said rings are rotated by said input shaft.

7. A mechanism as claimed in claim 6, in which said pockets are of double ended tear-drop shape and each of said balls is biased by its own compression spring in a direction which urges said rings apart.

8. A mechanism as claimed in claim 6, in which each of said pockets is of single ended tear-drop shape and each of said balls is biassed by its own compression spring in a direction which urges said rings apart.

9. A mechanism for abruptly checking the motion of a rotating input shaft comprising: an oil-filled casing; two rings which are axially and angularly displaceable with respect to one another mounted coaxially within said casing; interrupted frusto-conical braking surfaces provided on respective rims of said rings; opposed frusto-conical braking surfaces provided on the casing and extending in spaced parallel relationship with those of the rings; resilient means acting to urge the two rings apart; a thrust-transmitting assembly positioned between the rings and composed of balls located in a circle of spaced pockets providing respective camming surfaces; a series of circumferentially-spaced recesses provided on the rims of said rings and dividing said rims into spaced arcuate braking zones, each of said recesses converging towards at least one of said braking zones flanking it; a collar attached to said shaft inside said casing; a dog formed on one end-portion of said collar and extending radially and arcuately therefrom; one of said two rings being internally formed with a slot which receives said dog with a clearance fit enabling said ring limited displacement axially and circumferentially with respect to said dog and also limited tilting movement about its centre; a cylindrical surface on the other end-portion of said collar the second of said two rings being mounted with a clearance fit on said cylindrical surface which permits it limited axial and circumferential displacement and to tilt with respect to said collar; a stub shaft mounted at the opposite side of said casing to said shaft; a spider mounted inside the casing on said stub shaft and extending alongside said second ring; a circle of pins on said spider engaging in a circle of pockets in said second ring; manually rotatable means projecting from said casing in alignment with said stub shaft; and manually releasable means having a first operating condition at which said stub shaft and said manually releasable means are disconnected from one another, and a second operating condition at which they are coupled together to hold the braking surfaces of the rings away from the braking surfaces of the casing to render said mechanism temporarily inoperative.

10. A mechanism as claimed in claim 9, in which said manually releasable means is formed with a nut and an eccentric bore, said stub shaft is formed with an eccentric well alignable with said bore by rotation of said nut, and said manually releasable means comprises a screw member threadably engaging said bore and axially displaceable therein to locate one end of said screw member temporarily in said well to prevent rotation of said rings with respect to one another, said bore and well being in alignment when said rings are in their second operating conditions.

11. A mechanism as claimed in claim 1, wherein the recesses are formed on the rim of each ring and each recess converges towards at least one of said braking zones in a plane perpendicular to the input shaft.

12. A mechanism for checking motion of a rotating input shaft comprising:
a casing containing hydraulic liquid;
two rings which are axially and angularly displaceable with respect to one another, mounted coaxially within said casing;
braking surfaces provided on respective rims of said rings and lying on respective frusto-conical surfaces;
opposed braking surfaces provided on said casing and facing those of the rings, the braking surfaces of the casing also lying on frusto-conical surfaces which are complementary and parallel to those of the rings;
pumping means for creating cushions of hydraulic liquid under pressure between the complementary braking surfaces of the rings and the casing, the pressure of said pumping means being a function of the rotational speed of the input shaft;
a thrust-transmitting assembly positioned between the rings and composed of circular hard elements located respectively in a circle of spaced pockets providing respective camming surfaces, said circular hard elements locating in the deepest portions of said pockets when the rings are held at their closest positions to one another by the hydraulic pressure of the liquid in said cushions; and
resilient means acting individually on said elements to press each of them into one of the pockets of a pair of pockets between which the element is located, so that the element maintains its contact with said one of the pockets during axial displacement of the rings with respect to one another as the liquid pressure in the cushions collapses upon loss of input drive torque, relative angular movement between the rings with onset of braking driving the elements between the camming surfaces to wedge them apart and into braking engagement with the casing.

13. A mechanism as claimed in claim 12, in which said resilient means comprises a set of compression springs each exerting on a respective element a thrust having a first component which urges the element circumferentially of the ring in which it is located, and a second component which presses the element into a pocket of the other ring.

14. A mechanism as claimed in claim 13, in which said element is a ball and said compression spring is located in a bore that opens into the deepest part of a pocket in which the ball is located.

15. A mechanism as claimed in claim 14, in which each ball has an equatorial zone engaged on opposite sides, respectively, by part-circular corner edges of the two pockets between which the ball is located.

16. A mechanism as claimed in claim 15, in which each bore lies in its own chordal plane of the ring and its axis makes an acute angle with the plane of the ring.

17. A mechanism as claimed in claim 12, constructed as a coupling and having the pockets of the rings each formed with a central well shaped to fit part of the circumference of the element, and with two camming surfaces which slope from respective opposite sides of the well to the face of the ring facing the other ring.

18. A mechanism for checking reverse rotation of a rotary drive comprising:

an oil-filled casing;

two resiliently spaced rings which are axially and angularly displaceable with respect to one another mounted coaxially within said casing, one of the said rings being connected to the rotary drive or forming a link in the transmission of the rotary drive;

braking surfaces provided on respective rims of said rings and lying on respective frusto-conical surfaces;

opposed braking surfaces provided on the casing and facing those of the rings, the braking surfaces of the casing also lying on frusto-conical surfaces which are complementary and parallel to those of the rings;

pumping means creating cushions of oil under pressure between the complementary braking surfaces of the rings and the casing, the pressure of said pumping means being a function of rotational speed of the drive, said cushions dispersing and said complementary braking surfaces making light frictional engagement under pressure of resilient spacing means between the rings as forward rotation of the drive slows to a stop;

thrust generating means provided between the rings and composed of thrust resisting balls located respectively in a circle of opposed recesses in the opposed faces of said rings, the said opposed recesses being tear shaped for uni-directional checking having part spherical end form in their deepest portion with part circular section ramped seating extending in opposite directions respectively in opposed recesses or of double ended form for bi-directional checking having part spherical seating in their central and deepest portion with part circular section ramped seatings extending in both directions, said thrust generating means being responsive to reverse rotation of the drive to generate loading upon opposed braking surfaces of the rings and the housing sufficient to abruptly halt such motion; and the resilient spacing means being composed at least in part, of individual compression springs located respectively in bores in one of the opposed recesses of each of the arcuately spaced assemblies urging the thrust resisting ball into the part spherical seating in the deepest portion of the opposed recess during forward running thereby ensuring that as the drive reverses, the thrust generating means will be actuated by the ramped seatings of the recesses containing the springs respectively rolling the thrust resisting balls from the spherical seatings in the opposed recesses thereby giving progressive engagement with the associated ramped seatings resulting in prompt and reliable performance of the checking function.

* * * * *